United States Patent [19]

Colonias

[11] Patent Number: 5,380,115
[45] Date of Patent: Jan. 10, 1995

[54] HIP CORNER PLATE CONNECTION

[75] Inventor: Karen W. Colonias, Pleasant Hill, Calif.

[73] Assignee: Simpson Strong-Tie Co., Inc., San Leandro, Calif.

[21] Appl. No.: 136,789

[22] Filed: Oct. 14, 1993

[51] Int. Cl.[6] .............................................. F16B 9/00
[52] U.S. Cl. .................................. 403/170; 403/219; 403/231; 403/403; 52/92.2; 52/712
[58] Field of Search ............... 403/169, 170, 176, 217, 403/219, 231, 403; 52/90.1, 92.1, 92.2, 648.1, 650.2, 702, 712

[56] References Cited

U.S. PATENT DOCUMENTS

| | | | |
|---|---|---|---|
| 1,657,243 | 1/1928 | Daniels . | |
| 3,091,822 | 6/1963 | Fiekers | 20/94 |
| 3,184,800 | 5/1965 | Nelson | 20/1 |
| 3,333,875 | 8/1967 | Tracy | 403/170 |
| 3,925,954 | 12/1975 | Snow et al. | 52/752 |
| 3,967,908 | 7/1976 | Snow et al. | 403/219 |
| 4,229,915 | 10/1980 | Snow et al. | 52/92 |
| 4,410,294 | 10/1983 | Gilb | 403/27 |
| 4,669,235 | 6/1987 | Reiner | 52/98 |
| 4,713,923 | 12/1987 | Sielaff | 52/713 |
| 4,714,372 | 12/1987 | Commins | 403/400 |
| 4,932,173 | 6/1990 | Commins | 52/92 |
| 5,217,317 | 6/1993 | Young | 52/702 |
| 5,230,198 | 7/1993 | Callies | 52/702 |
| 5,236,273 | 8/1993 | Gilb | 403/232.1 |

OTHER PUBLICATIONS

Simpson Strong-Tie Co., Inc. copyright 1993 catalog A269 cover page and p. 52.

*Primary Examiner*—Richard A. Bertsch
*Assistant Examiner*—William Wicker
*Attorney, Agent, or Firm*—James R. Cypher

[57] ABSTRACT

A hip corner plate connection in which a single element sheet metal hip corner plate connector is used to connect a hip rafter most commonly occurring in wood frame buildings having a stick-framed roof of either dimensional lumber or plywood I-rafters to the top plates of the supporting walls. The sheet metal hip corner plate connector includes base members which attach to the single or double top plates of the framed wall, and flanges which attach to the hip rafter. The base members provide a gusset-like connection to tie the corner walls together and flanges provide lateral as well as uplift resistance to wind and seismic forces acting on the hip rafter,

4 Claims, 5 Drawing Sheets

HIP CORNER PLATE CONNECTION

BACKGROUND

This invention relates to a hip rafter to corner plate connection; most commonly occurring in wood frame buildings having a stick-framed roof of either dimensional lumber or plywood I-rafters. The invention may be used in traditional hip roofs which is one of the four basic roof shapes, or it may be used in roofs which are a combination of the basic shapes.

A hip is defined as the outside corner where two planes of a roof meet. It is comprised of a hip rafter at the corner and jack rafters from the hip to the eave. The hip rafter is supported at its lower end by the wall at plate level (or by a post) and at its upper end by the ridge (or by a wall).

Sheet metal connectors for joining common rafters to wood top plate members have been in use for some time and come in many different configurations. There is, however, only one commercially available connector known to applicant for joining hip rafters to corner plates and it was granted to Tyrell T. Gilb Aug. 17, 1993 for Rafter-to-Corner Plate Connection, U.S. Pat. No. 5,236,273. The Gilb connector, however, if used in a building with a right angled corner requires that the corner of the wood lower corner plate and the wood top plate be bevel cut. In addition, the Gilb connector gives minimal lateral support to prevent overturning to the hip rafter. A further limitation of Gilb is that the connector cannot be installed after the hip rafter has been nailed to the top plates.

The rafter-to-corner plate connectors taught by a few patents, none of which are known to be commercially available, are considered impractical because they are either too costly to manufacture or are incapable of handling the many different rafter slope angles.

The current practice of many roofing contractors is to use a Simpson hurricane tie or twist strap and flatten the 90 degree bend to a 45 degree bend to accommodate the rafter. This practice is costly because of the additional labor cost in bending the metal on the job and does not provide an architecturally aesthetic solution.

SUMMARY OF THE INVENTION

The hip corner plate of the present invention is economical to manufacture and easy to install.

The hip corner plate of the present invention may be installed after the hip is in place and requires no bevel cuts of the corner plates.

The hip corner plate of the present invention can accommodate various roof pitches without modification of the connector and is able to resist high uplift loads for all pitches.

In addition to resisting uplift loads, the hip corner plate acts as a gusset plate in strengthening the corner of the structure, and provides lateral stability to the hip rafter.

A further advantage is the fact that the hip corner plate can be attached to both top plates with a minimum amount of fasteners in the end grain.

DESCRIPTION OF THE INVENTION

Figure 1:
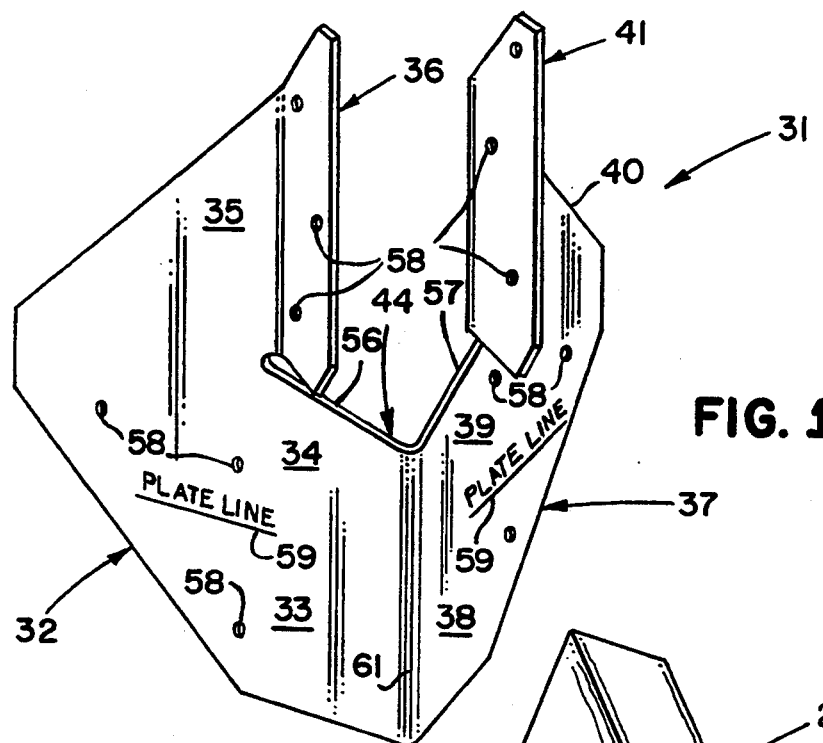
FIG. 1 is a perspective view of the hip corner plate connector of the present invention.
Figure 2:
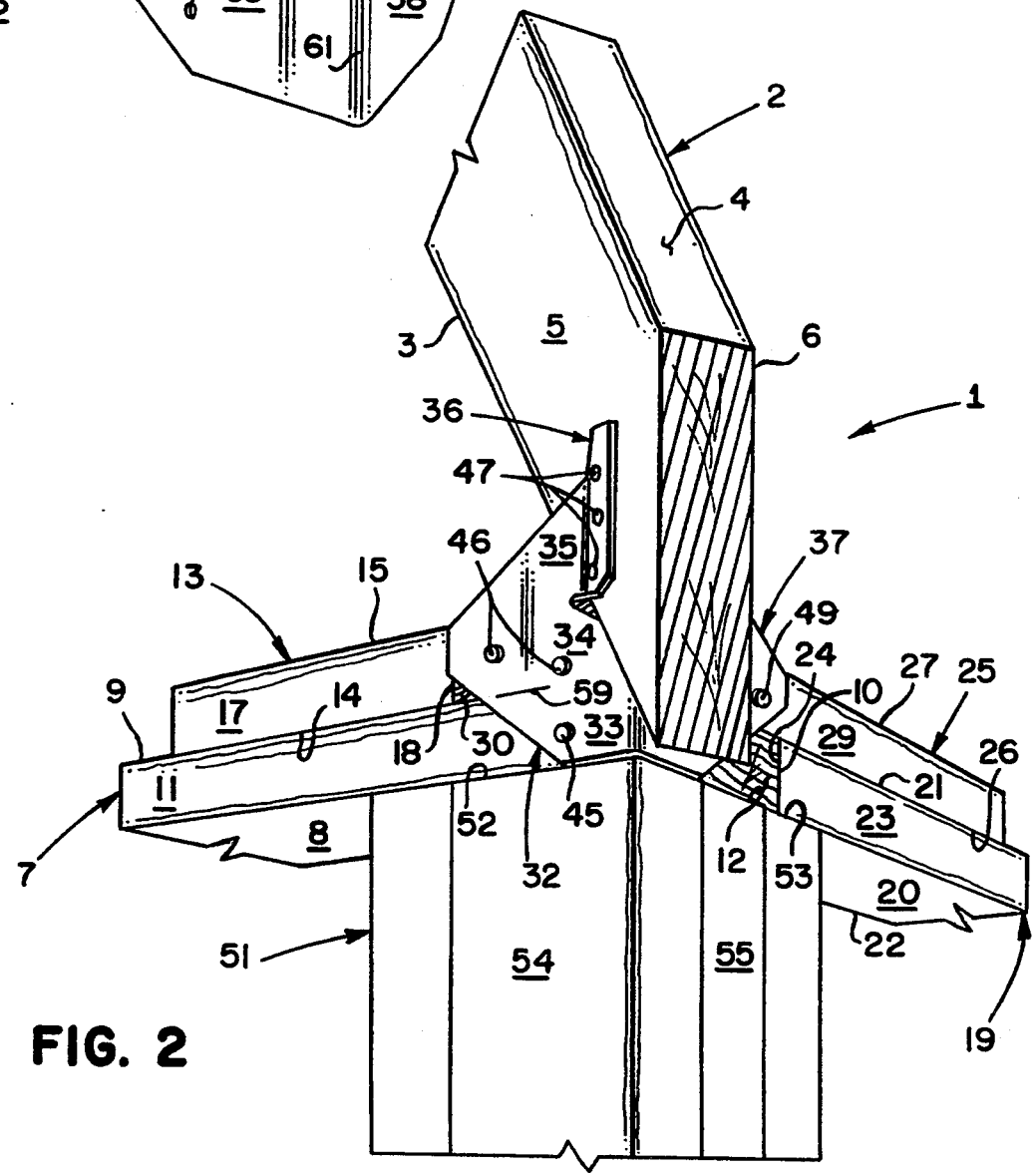
FIG. 2 is a perspective view of the hip corner plate connector illustrated in FIG. 1 installed in a typical corner intersection on dual top plates of a building using stick frame construction.
Figure 3:
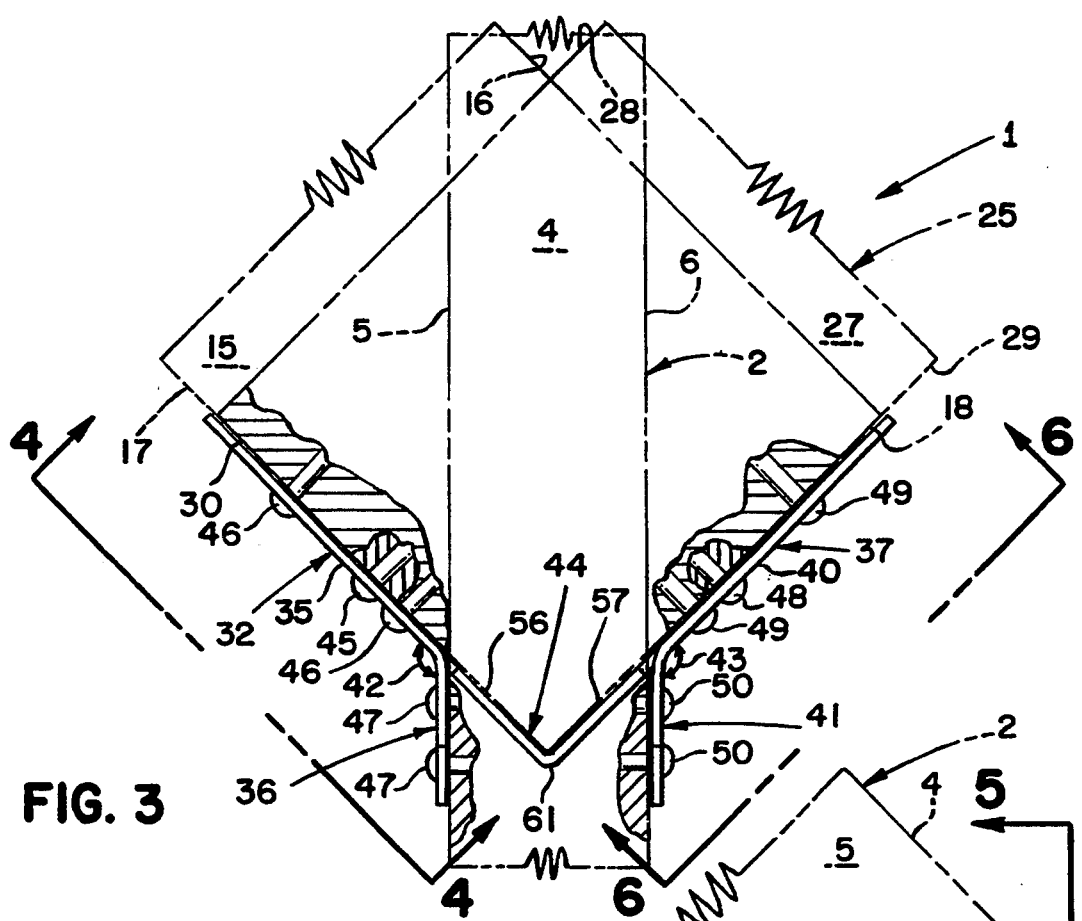
FIG. 3 is top plan view of the hip corner plate connector illustrated in FIGS. 1 and 2 with the corner intersection and portions of the top plates and hip rafter in phantom line.
Figure 4:
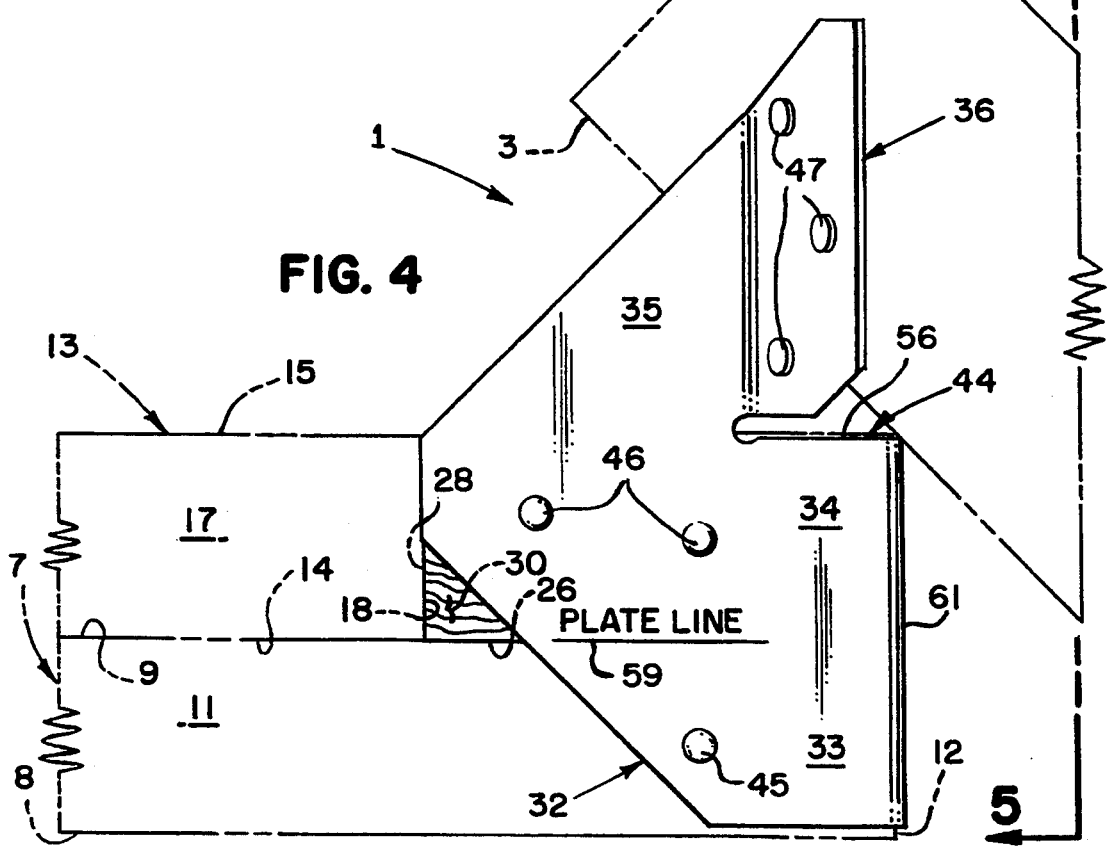
FIG. 4 is a left side elevation view of the hip corner plate taken along line 4—4 of FIG. 3 with portions of the hip rafter and top plates in phantom line.
Figures 5, 6:
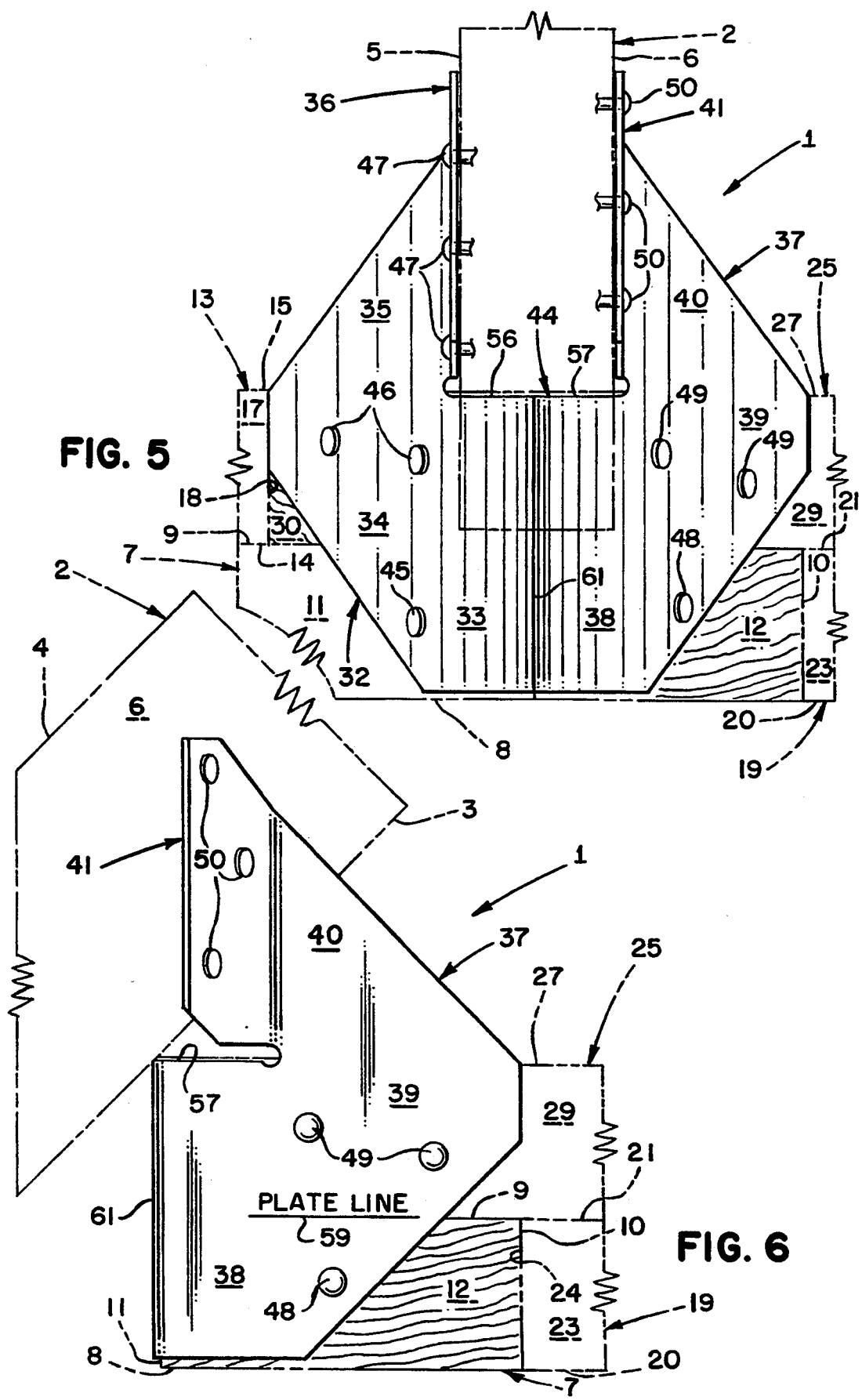
FIG. 5 is a front elevation view of the hip corner plate connector taken along line 5—5 of FIG. 4.
FIG. 6 is a right side elevation view of the hip corner plate connector taken along line 6—6 of FIG. 3.

The hip corner plate connection 1 of the present invention in a building structure consists of hip rafter 2 having a bottom edge 3, a top edge 4 and generally parallel first and second side faces 5 and 6; a first lower plate member 7 having a lower face 8, a generally parallel upper face 9, inner and outer side edges 10 and 11, and an end face 12; a first top plate member 13 having, a first lower face 14 in registration with a portion of the upper face 9 of the first lower plate member 7, a top face 15, inner and outer side edges 16 and 17, and an end face 18; a second lower plate member 19 having a lower face 20, a generally parallel upper face 21, inner and outer side edges 22 and 23, and an end face 24 abutting a portion of the inner side edge 10 of the first lower plate member 7; a second top plate member 25 having, a first lower face 26 in registration with a portion of the upper face 21 of the second lower plate member 19, a top face 27, inner and outer side edges 28 and 29 and an end face 30; a single element sheet metal hip corner plate connector 31 having: a first base member 32 including a lower portion 33 in close registration with a portion of the outer side edge 11 of the first lower plate member 7, a mid portion 34 in close registration with a portion of the end face 30 of the second top plate member 25, and an upper portion 35, a first hip rafter flange 36 integrally connected to the upper portion 35 of the first base member 32 extending at an angle 42 thereto, and dimensioned and positioned for registration with a portion of the first side face 5 of the hip rafter 2, a second base member 37 integrally connected to the first base member 32 at a generally right angle including a lower portion 38 in close registration with a portion of the end face 12 of the first lower plate member 7, a midportion 39 in close registration with a portion of the outer side edge 29 of the second top plate member 25, and an upper portion 40, a second hip rafter flange 41 integrally connected to the upper portion 40 of the second base member 37 extending at an angle 43 thereto in generally parallel relation to the first hip rafter flange 36, and dimensioned and positioned for registration with a portion of the second side face 6 of the hip rafter 2, and a seat edge 44 formed in the hip corner plate connector 31 extending between the first and second hip rafter flanges 36 and 41 and dimensioned and positioned for receiving a portion of the bottom edge 3 of the hip rafter 2; first fastener means 45 penetrating the lower portion 33 of the first base member 32 and the outer side edge 11 of the first lower plate member 7; second fastener means 46 penetrating the mid portion 34 of the first base member 32 and the end face 30 of the second top plate member 25; third fastener means 47 penetrating the first hip rafter flange 36 and the hip rafter 2; fourth fastener means 48 penetrating the lower portion 38 of the second base member 37 and the end face 12 of the first lower corner plate member 7; fifth fastener means 49 penetrating the midportion 39 of the second base member 37 and the outer side edge 29 of the second top plate member 25; and sixth fastener means 50 penetrating the second hip rafter flange 41 and the hip rafter 2.

In another form of the invention where the first and second top plate members 13 and 25 rest directly upon the top ends of studs and upon a corner post instead of upon a lower plate member, the hip corner plate connection 1 in a building structure consists of: a hip rafter 2 having a bottom edge 3, a top edge 4 and generally parallel first and second side faces 5 and 6; support means 51 having first and second upper faces 52 and 53, and first and second outer side faces 54 and 55; a first top plate member 13 having a first lower face 14 in registration with a portion of the first upper face 52 of the support means 51, a top face 15, inner and outer side edges 16 and 17, and an end edge 18; a second top plate member 25 having, a first lower face 26 in registration with a portion of the second upper face 53 of the support means 51, a top face 27, inner and outer side edges 28 and 29 and an end face 30; a single element sheet metal hip corner plate connector 31 having: a first base member 32 including a lower portion 33 in close registration with a portion of the first outer side face 54 of the support means 51, a midportion 34 in close registration with a portion of the end face 30 of the second top plate member 25, and an upper portion 35, a first hip rafter flange 2 integrally connected to the upper portion 35 of the first base member 32 extending at an angle 42 thereto, and dimensioned and positioned for registration with a portion of the first side face 5 of the hip rafter 2, a second base member 37 integrally connected to the first base member 32 at a generally right angle including a lower portion 38 in close registration with a portion of the second outer side face 55 of the support means 51, a mid portion 39 in close registration with a portion of the outer side edge 29 of the second top plate member 25, and an upper portion 40, a second hip rafter flange 41 integrally connected to the upper portion 40 of the second base member 37 extending at an angle 43 thereto in generally parallel relation to the first hip rafter flange 36, and dimensioned and positioned for registration with a portion of the second side face 6 of the hip rafter 2, and a seat edge 44 formed in the hip corner plate connector 31 extending between the first and second hip rafter flanges 36 and 41 and dimensioned and positioned for receiving a portion of the bottom edge 3 of the hip rafter 2; first fastener means 45 penetrating the lower portion 33 of the first base member 32 and the first outer side face 54 of the support means 51; second fastener means 46 penetrating the mid portion 34 of the first base member 32 and the end face 30 of the second top plate member 25; third fastener means 47 penetrating the first hip rafter flange 36 and the hip rafter 2; fourth fastener means 48 penetrating the lower portion 38 of the second base member 37 and the second outer side face 55 of the support means 51; fifth fastener means 49 penetrating the midportion 39 of the second base member 37 and the outer side edge 29 of the second top plate member 25; and sixth fastener means 50 penetrating the second hip rafter flange 41 and the hip rafter 2.

Preferably, the seat edge 44 is formed in the hip corner plate connector 31 by means of a first generally straight edge 56 formed in the first base member 32 and a second generally straight edge 57 formed in the second base member in the same plane and intersecting the first generally straight edge 56. The hip corner plate connector 31 is constructed so that it is not necessary to "bird mouth" the hip rafter 2; i.e. cut a notch in the lower side. However, if it is necessary to "bird mouth" the hip rafter 2, the hip corner plate connector 31 can still accommodate such a rafter.

In addition, the first and second hip rafter flanges 36 and 41 are preferably bent to form obtuse angles 42 and 43 with the upper portions 35 and 40 of the first and second base members 32 and 37 respectively.

To assist in the installation, fastener openings 58 may be formed in the sheet metal hip corner plate connector 31 for receiving the first through sixth fastener means 45–50.

As a further aid in installing the hip corner plate connector, indicia means 59 may be marked on the hip corner plate connector 31 indicating an alignment plane with the first lower faces 14 and 26 of the first and second top plate members 13 and 25.

Figure 7:
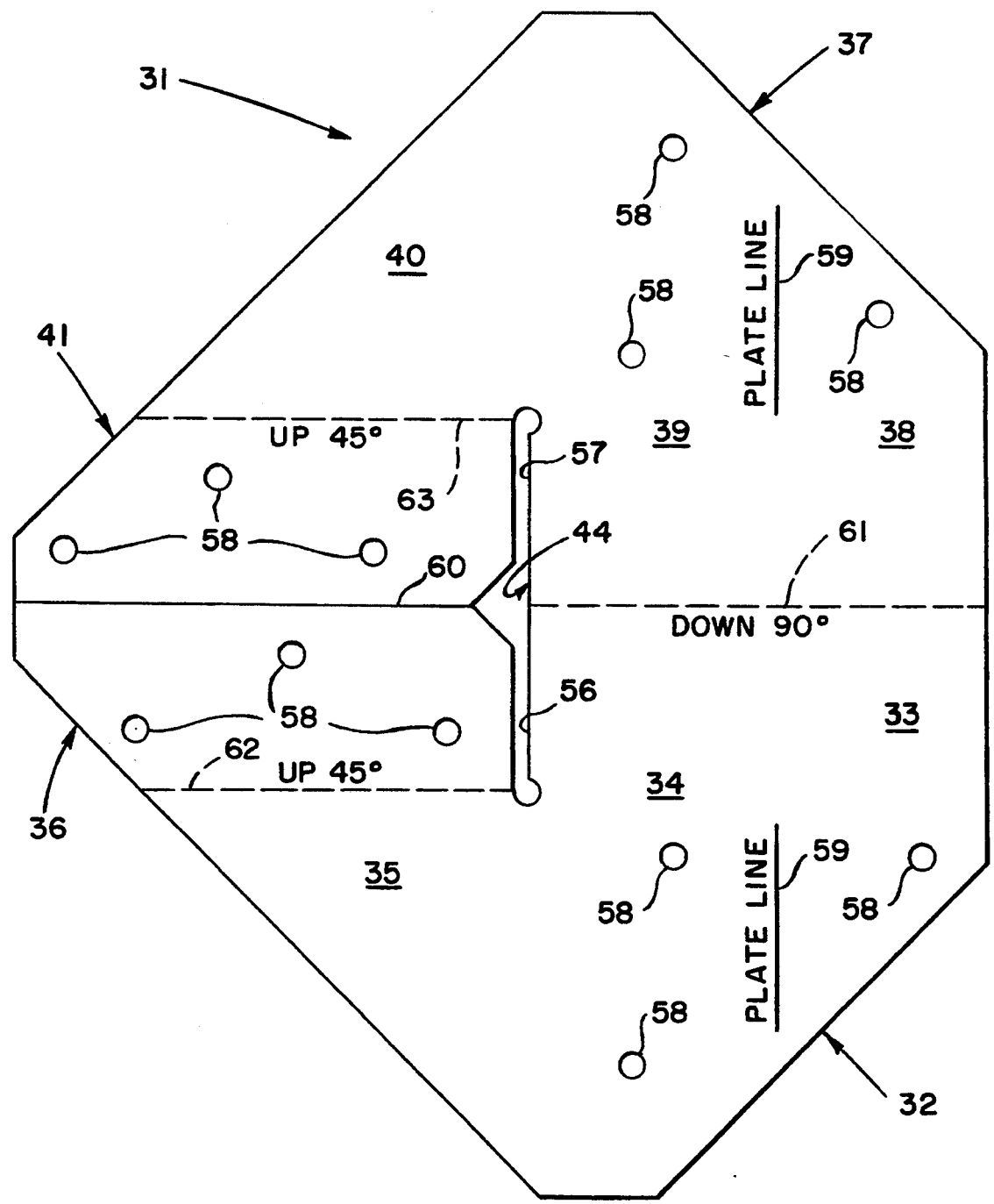
FIG. 7 is a top plan view of the sheet metal blank of a hip corner plate connector as illustrated in FIG. 1 and typically used to connect a single 2x hip rafter.
Figure 8:
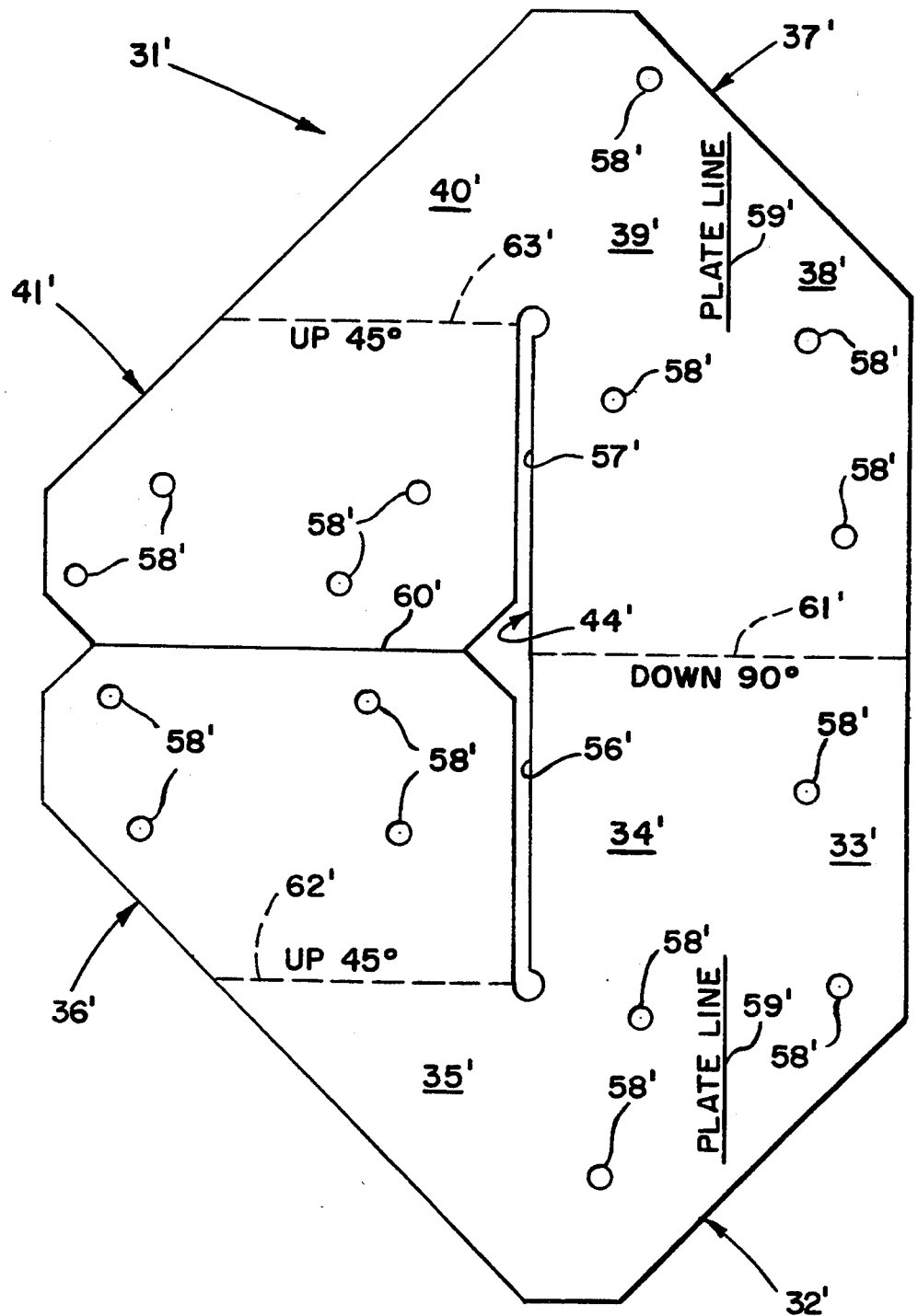
FIG. 8 is a top plan view of a modified sheet metal blank of a hip corner plate connector of the type illustrated in FIG. 1, but typically used to connect a dual 2 x hip rafter.

Another form of the invention is illustrated in FIG. 8. The hip corner plate connector 31' illustrated in FIG. 8 is used to connect dual 2 x hip rafters in a hip corner plate connection and is identical in construction and function to the hip corner plate connector illustrated in FIGS. 1–7 except for increases in dimensions and number of nail openings. Like parts have been given identical numbers and are distinguished only by the addition of a prime mark ('). Since the construction and function of the hip corner plate connector 31' is identical to the hip corner plate connector 31 previously described, in the interest of brevity, no further description is believed necessary.

As an example, the hip corner plate may be made of 18 gauge galvanized metal. The hip corner plate as illustrated in FIGS. 1–7 and used to connect a single hip rafter 2 to first lower plate 7, second lower plate member 19, first top plate member 13, and second top plate member 25 is code rated to withstand uplift loads of 665 pounds and lateral loads of 400 pounds. The hip corner plate as illustrated in FIG. 8 and used for dual hip rafters has a code rating of 1000 pounds in uplift and 450 pounds of lateral load.

As may be seen from the illustrations, lateral support for the hip rafter 2 is provided by upper portion 35 of first base member 32 and upper portion 40 of second base member 37.

There is no set way of installing the hip corner plate connector 31. A method preferred by many builders is to temporarily attach the hip rafter 2 to the ridge member and to the first and second top plate members 13 and 25 and then insert the hip corner plate connector 31 from beneath the hip rafter 2 so that the indicia means 59 lines up with the first lower faces of first and second top plate members 13 and 25. Fastener means 45, 46, 48 and 49 are then driven so that the hip corner plate connector 31 is secured to the first lower plate member 7, first top plate member 13, second lower plate member 19, and second top plate member 25. Next, third fastener means 47 are inserted through openings 58 in first hip rafter flange 36 into hip rafter 2. Finally, sixth fastener means 50 are driven through openings 58 in second hip rafter flange 41 into hip rafter 2.

Fabrication of the hip corner plate connect 31 is preferably from a flat sheet metal blank as illustrated in FIGS. 7 and 8. First, the blank is cut in the shape generally illustrated and cuts are made in the blank to form the seat edge 44. Another cut is made along line 60 to form the first and second hip rafter flanges 36 and 41. A 90° bend is then made along line 61 to form the intersection of first and second base members 32 and 37. Finally, 45° bends are made along bend lines 62 and 63 upwardly as illustrated in FIGS. 7 and 8 to place first and second hip rafter flanges 36 and 41 in the proper position for receipt of hip rafter 2.

I claim:

1. A hip corner plate connection in a building structure comprising:
   a. a hip rafter having a bottom edge, a top edge and generally parallel first and second side faces;
   b. support means having first and second upper faces, and first and second outer side faces;
   c. a first top plate member having, a first lower face in registration with a portion of said first upper face of said support means, a top facet inner and outer side edges, and an end edge;
   d. a second top plate member having, a first lower face in registration with a portion of said second upper face of said support means, a top face, inner and outer side edges and an end face;
   e. a single element sheet metal hip corner plate connector having:
      1. a first base member including a lower portion in close registration with a portion of said first outer side face of said support means, a mid portion in close registration with a portion of said end face of said second top plate member, and an upper portion,
      2. a first hip rafter flange integrally connected to said upper portion of said first base member extending at an angle thereto, and dimensioned and positioned for registration with a portion of said first side face of said hip rafter,
      3. a second base member integrally connected to said first base member at a generally right angle including a lower portion in close registration with a portion of said second outer side face of said support means, a mid portion in close registration with a portion of said outer side edge of said second top plate member, and an upper portion,
      4. a second hip rafter flange integrally connected to said upper portion of said second base member extending at an angle thereto in generally parallel relation to said first hip rafter flange, and dimensioned and positioned for registration with a portion of said second side face of said hip rafter, and
      5. a seat edge formed in said hip corner plate connector extending between said first and second hip rafter flanges and dimensioned and positioned for receiving a portion of said bottom edge of said hip rafter;
   f. first fastener means penetrating said lower portion of said first base member and said first outer side face of said support means;
   g. second fastener means penetrating said mid portion of said first base member and said end face of said second top plate member;
   i. third fastener means penetrating said first hip rafter flange and said hip rafter;
   j. fourth fastener means penetrating said lower portion of said second base member and said second outer side face of said support means;
   k. fifth fastener means penetrating said midportion of said second base member and said outer side edge of said second top plate member; and
   l. sixth fastener means penetrating said second hip rafter flange and said hip rafter.

2. A hip corner plate connection in a building structure comprising:
   a. a hip rafter having a bottom edge, a top edge and generally parallel first and second side faces;
   b. a first lower plate member having a lower face, a generally parallel upper face, inner and outer side edges, and an end face;
   c. a first top plate member having, a first lower face in registration with a portion of said upper face of said first lower plate member, a top face, inner and outer side edges, and an end edge;
   d. a second lower plate member having a lower face, a generally parallel upper face, inner and outer side edges, and an end edge abutting a portion of said inner side edge of said first lower plate member;
   e. a second top plate member having, a first lower face in registration with a portion of said upper face of said second lower plate member, a top face, inner and outer side edges and an end face;
   f. a single element sheet metal hip corner plate connector having:
      1. a first base member including a lower portion in close registration with a portion of said outer side edge of said first lower plate member, a mid portion in close registration with a portion of said end face of said second top plate member, and an upper portion,
      2. a first hip rafter flange integrally connected to said upper portion of said first base member extending at an angle thereto, and dimensioned and positioned for registration with a portion of said first side face of said hip rafter,
      3. a second base member integrally connected to said first base member at a generally right angle including a lower portion in close registration with a portion of said end face of said first lower plate member, a mid portion in close registration with a portion of said outer side edge of said second top plate member, and an upper portion,
      4. a second hip rafter flange integrally connected to said upper portion of said second base member extending at an angle thereto in generally parallel relation to said first hip rafter flange, and dimensioned and positioned for registration with a portion of said second side face of said hip rafter, and
      5. a seat edge formed in said hip corner plate connector extending between said first and second hip rafter flanges and dimensioned and positioned for receiving a portion of said bottom edge of said hip rafter;
   g. first fastener means penetrating said lower portion of said first base member and said outer side edge of said first lower plate member;

h. second fastener means penetrating said mid portion of said first base member and said end face of said second top plate member;
i. third fastener means penetrating said first hip rafter flange and said hip rafter;
j. fourth fastener means penetrating said lower portion of said second base member and said end face of said first lower corner plate member;
k. fifth fastener means penetrating said midportion of said second base member and said outer side edge of said second top plate member; and
l. sixth fastener means penetrating said second hip rafter flange and said hip rafter.

3. A hip corner plate connection as described in claim 2 comprising:
a. said seat edge formed in said hip corner plate connector includes a first generally straight edge formed in said first base member and a second generally straight edge formed in said second base member in the same plane and intersecting said first generally straight edge;
b. said first and second hip rafter flanges are bent to form obtuse angles with said upper portions of said first and second base members respectively; and
c. fastener openings formed in said sheet metal hip corner plate connector for receiving said first through sixth fastener means.

4. A hip corner plate connection as described in claim 3 comprising:
a. indicia means marked on said hip corner plate connector indicating an alignment plane with the first lower faces of said first and second top plate members.

* * * * *